United States Patent [19]
Tuttle

[11] Patent Number: 5,970,398
[45] Date of Patent: Oct. 19, 1999

[54] RADIO FREQUENCY ANTENNA WITH CURRENT CONTROLLED SENSITIVITY

[75] Inventor: John R. Tuttle, Boise, Id.

[73] Assignee: Micron Communications, Inc., Boise, Id.

[21] Appl. No.: 08/704,965

[22] Filed: Aug. 29, 1996

Related U.S. Application Data

[60] Provisional application No. 60/023,318, Jul. 30, 1996.

[51] Int. Cl.$^6$ ...................................................... H04B 1/18
[52] U.S. Cl. .......................... 455/193.1; 455/271; 342/51
[58] Field of Search .................................. 455/66, 73, 90, 455/575, 191.1, 191.2, 193.1, 193.2, 193.3, 195.1, 196.1, 254, 269, 271, 284, 289, 290; 342/42, 44, 51

[56] References Cited

U.S. PATENT DOCUMENTS

| | | | |
|---|---|---|---|
| 4,075,632 | 2/1978 | Baldwin et al. | 343/6.8 |
| 4,572,976 | 2/1986 | Fockens | 307/524 |
| 4,724,427 | 2/1988 | Carroll | 340/572 |
| 4,854,328 | 8/1989 | Pollack | 128/736 |
| 4,857,893 | 8/1989 | Carroll | 340/572 |
| 4,862,160 | 8/1989 | Ekchian et al. | 340/825.54 |
| 4,870,419 | 9/1989 | Baldwin et al. | 342/50 |

(List continued on next page.)

OTHER PUBLICATIONS

"*CMOS Analog Integrated Circuits Based on Weak Inversion Operation*", by Eric Vittoz and Jean Fallrath, IEEE Journal of Solid State Circuits, vol. SC–12, No. 3, Jun. 1977.
Mitsubishi Motors Corporation Web Page, 1995.
"*Digital RF/ID Enhances GPS*", by John R. Tuttle, Proceedings of the Second Annual Wireless Symposium, pp. 406–411, Feb. 15–18, 1994, Santa Clara, CA.
"*Micron Morning Report*", The Idaho Statesman, Jul. 16, 1993.
"*A Low–Power Spread Spectrum CMOS RFIC for Radio Identification Applications*", by John R. Tuttle, Conference Proceedings from RF Expo West, pp. 216–222, Mar. 22–24, 1994, San Jose, CA.
Provisional Patent Application, Ser. No. 60/017,900, Filed May 13, 1996.
Provisional Patent Application, Ser. No. 60/023,321, Filed Jul. 30, 1996.

*Primary Examiner*—Reinhard J. Eisenzopf
*Assistant Examiner*—Sam Bhattacharya
*Attorney, Agent, or Firm*—Wells, St. John, Roberts, Gregory & Matkin, P.S.

[57] ABSTRACT

An antenna circuit configured for use in a radio frequency data communications device has an antenna constructed and arranged to transfer electromagnetic waves, the electromagnetic waves corresponding to a signal carried by the antenna and generated from a signal source. A Schottky diode is electrically coupled in serial relation with the antenna, and in operation the signal is applied serially across the antenna and the diode in direct relation with electromagnetic waves transferred by the antenna. A bias current supply is also electrically coupled to the Schottky diode and is configurable to deliver a desired bias current across the current. The diode is responsive to the bias current to realize a desired diode impedance such that a desired impedance matched/mis-matched is provided between impedance of the diode and impedance of the antenna when the signal is applied across the antenna circuit, which selectively tunes the antenna circuit by imparting a desired power transfer therein. In one version, the antenna receives electromagnetic waves in the form of a radio frequency signal from a separate signal source which imparts a signal carried by the antenna to the antenna circuit such that the antenna circuit is powered by the signal. In another version, a separate signal source is provided in electrical communication with the antenna circuit such that the antenna circuit is powered by the signal source, preferably an oscillating source, which drives the antenna to produce transmitting electromagnetic waves.

11 Claims, 4 Drawing Sheets

U.S. PATENT DOCUMENTS

| | | | |
|---|---|---|---|
| 4,888,591 | 12/1989 | Landt et al. | 342/44 |
| 4,890,072 | 12/1989 | Espe et al. | 331/11 |
| 4,912,471 | 3/1990 | Tyburski et al. | 342/42 |
| 4,926,182 | 5/1990 | Ohta et al. | 342/44 |
| 5,086,389 | 2/1992 | Hassett et al. | 364/401 |
| 5,134,085 | 7/1992 | Gilgen et al. | 437/52 |
| 5,144,314 | 9/1992 | Malmberg et al. | 342/44 |
| 5,164,985 | 11/1992 | Nysen et al. | 380/9 |
| 5,175,774 | 12/1992 | Truax et al. | 382/8 |
| 5,272,367 | 12/1993 | Dennison et al. | 257/306 |
| 5,287,112 | 2/1994 | Schuermann | 342/42 |
| 5,300,875 | 4/1994 | Tuttle | 320/20 |
| 5,323,150 | 6/1994 | Tuttle | 340/825.54 |
| 5,365,551 | 11/1994 | Snodgrass et al. | 375/1 |
| 5,374,930 | 12/1994 | Schuermann | 342/42 |
| 5,406,263 | 4/1995 | Tuttle | 340/572 |
| 5,420,757 | 5/1995 | Eberhardt et al. | 361/813 |
| 5,448,242 | 9/1995 | Sharpe et al. | 342/42 |
| 5,461,385 | 10/1995 | Armstrong | 342/42 |
| 5,471,212 | 11/1995 | Sharpe et al. | 342/51 |
| 5,489,546 | 2/1996 | Ahmad et al. | 437/57 |
| 5,500,650 | 3/1996 | Snodgrass et al. | 342/42 |
| 5,621,412 | 4/1997 | Sharpe et al. | 342/51 |
| 5,649,296 | 7/1997 | MacLellan et al. | 455/38.2 |

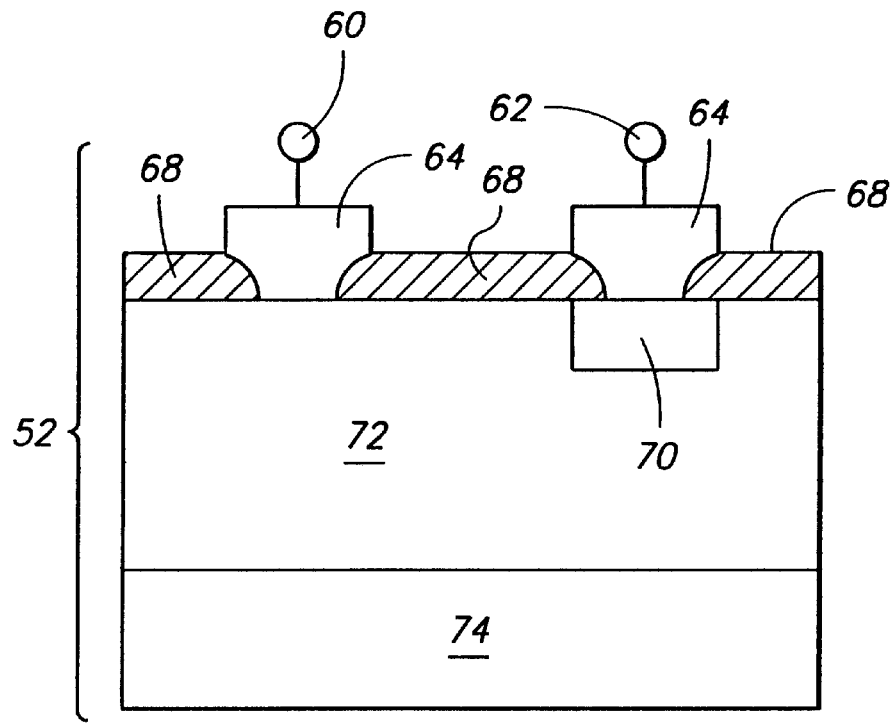
_Fig. 6_
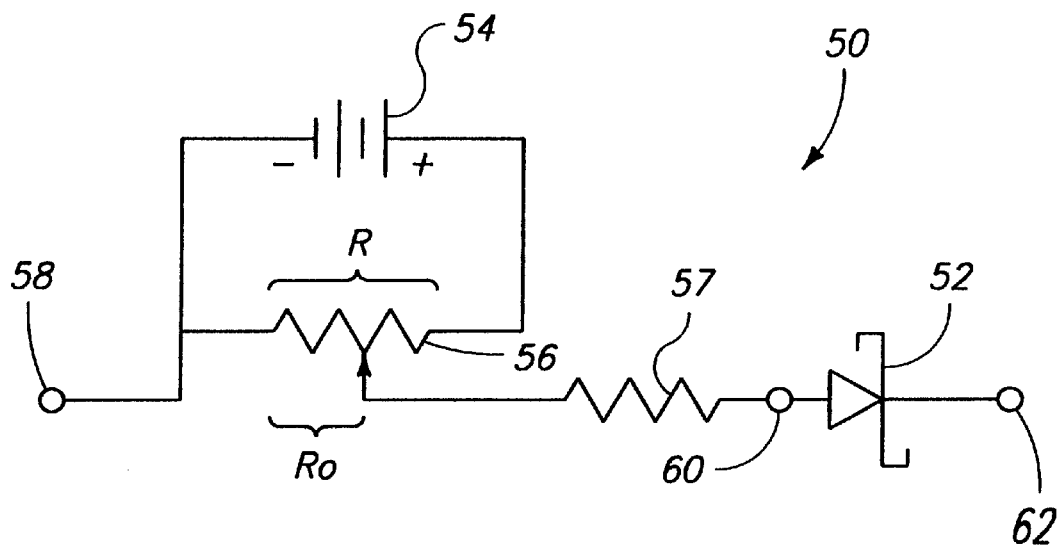
_Fig. 7_

RADIO FREQUENCY ANTENNA WITH CURRENT CONTROLLED SENSITIVITY

CROSS-REFERENCE TO RELATED APPLICATIONS

This application claims priority from a U.S. provisional application (60/023,318), filed Jul. 30, 1996, titled "Radio Frequency Antenna with Current Controlled Sensitivity," and naming as inventor John R. Tuttle.

TECHNICAL FIELD

This invention relates to radio frequency communications systems, and more particularly to an adjustable radio frequency antenna circuit and method of adjusting sensitivity.

BACKGROUND OF THE INVENTION

As antennas are implemented on an ever-broader range of communications devices, there is a continuous need to provide antenna implementations that realize a desired signal sensitivity, both in transmitting and receiving modes. Particularly, for radio frequency tag devices there is a need to provide a tag device having antennas with adjustable reception for tracking a variety of objects including goods, items, persons, or animals, as well as any moving or stationary and animate or inanimate object. One way is to produce a large assortment of tag devices, each having an antenna with a uniquely constructed radio frequency transmitting and receiving sensitivity. However, once produced each device will have an antenna with a single built-in sensitivity, and without the implementation of additional circuitry or modifications to the antenna, the antenna sensitivity can not be modified. Therefore, there is a need for an antenna construction having an easily adjusted receiver sensitivity. Likewise, there is a similar need for an antenna construction having an easily adjusted transmitter sensitivity.

Another reason for implementing an adjustable radio frequency communications device is readily apparent in the field of electronic identification systems in order to extend useful life where battery powered devices are utilized. For example, battery powered transponders or tag devices are presently commercially available that are affixed to an object in order to monitor location of the object. A controller or interrogator unit transmits an interrogation signal to the device during use in order to initiate location of the device. The device receives the signal, and generates and then transmits a responsive signal. The interrogation signal and the responsive signal are typically radio frequency (RF) signals produced by an RF transmitter circuit. Due to the relatively large transmission distances available with RF signals, RF-based transponder devices tend to be more suitable for applications requiring tracking of a tagged device that may not be in close proximity to an interrogator unit. However, using a large number of these devices, the interrogator unit tends to trigger frequent wake-up of each device. As a result, responsive signals are frequently generated. For each case of a battery powered device, the life of the battery is severely diminished due to frequent unintentional wake-ups of the device. Therefore, there is a need to produce tag devices having different receiver sensitivities, and to produce tag devices having either factory or user adjustable antenna circuit sensitivity. Such constructions comprise the subject matter of this invention.

BRIEF DESCRIPTION OF THE DRAWINGS

Preferred embodiments of the invention are described below with reference to the following accompanying drawings.

FIG. 6 illustrates a semiconductor integrated circuit construction for the Schottky diode of FIG. 5 implemented as a transponder circuit element on the integrated circuit of FIG. 2.

FIG. 7 illustrates an exemplary circuit implementation for realizing the current controlled Schottky diode of FIGS. 3 and 5.

DETAILED DESCRIPTION OF THE PREFERRED EMBODIMENTS

Figure 1:
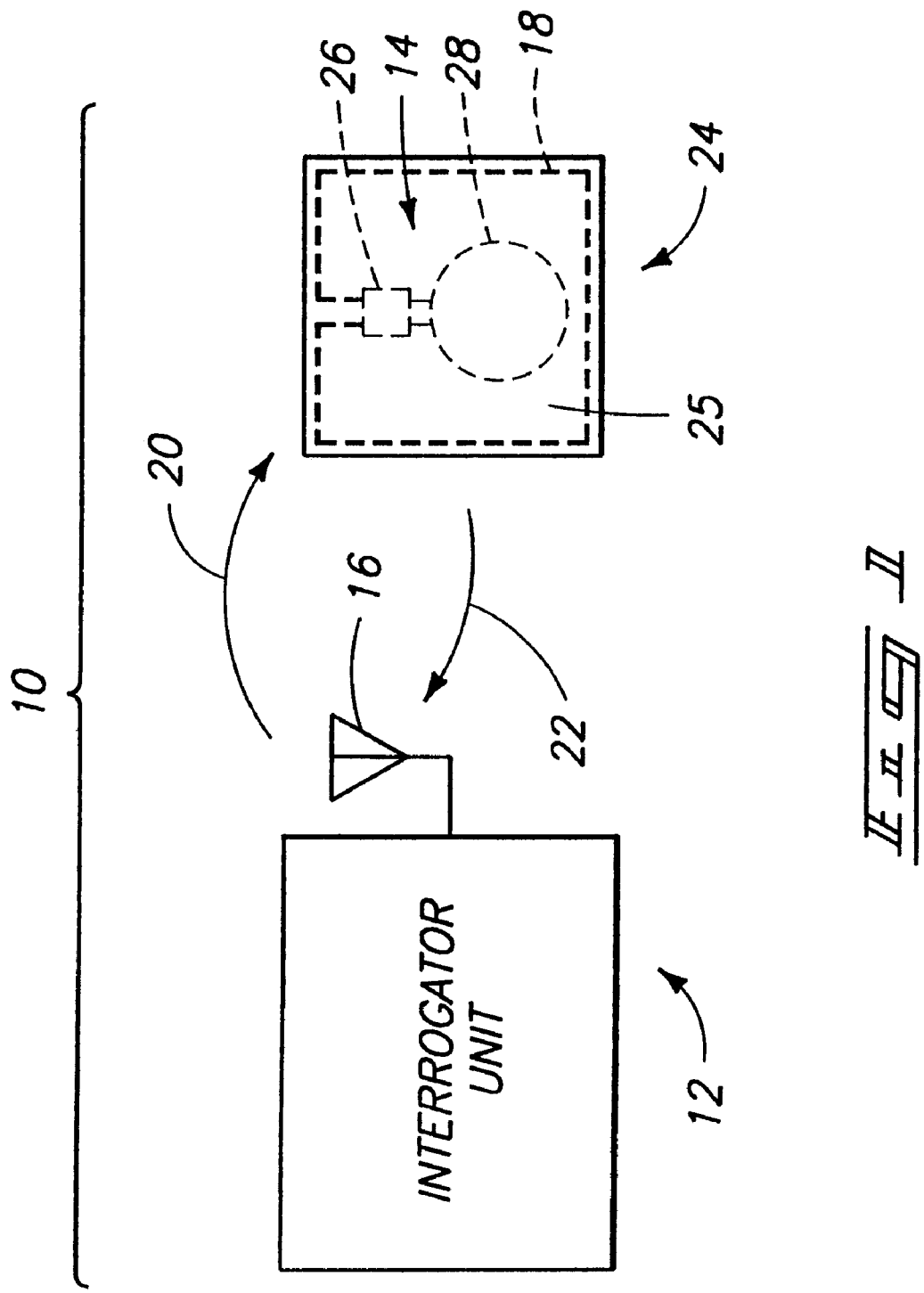
FIG. 1 is a block diagram of an electronic identification system including a radio frequency identification tag having a radio frequency antenna circuit with current controlled sensitivity of this invention.

This disclosure of the invention is submitted in furtherance of the constitutional purposes of the U.S. Patent Laws "to promote the progress of science and useful arts" (Article 1, Section 8).

According to an aspect of this invention, a radio frequency antenna circuit comprises:

an antenna constructed and arranged to transfer electromagnetic waves, the electromagnetic waves corresponding to a signal carried by the antenna and generated from a signal source;

a Schottky diode electrically coupled in serial relation with the antenna, in operation the signal being applied serially across the antenna and the diode in direct relation with electromagnetic waves transferred by the antenna; and a bias current supply electrically coupled to the Schottky diode and configurable to deliver a desired bias current across the Schottky diode, the Schottky diode responsive to the bias current to realize a desired impedance across the Schottky diode such that a desired impedance match is provided between impedance of the Schottky diode and impedance of the antenna when the signal is applied across the antenna circuit, which selectively tunes the antenna circuit by imparting a desired power transfer therein.

According to another aspect of this invention, a microprocessor controlled tag apparatus comprises:

a package;

a monolithic semiconductor integrated circuit supported by the package and having a microprocessor and integrated circuitry fabricated therein; and a transponder electrically connected to the integrated circuitry of the semiconductor integrated circuit, the transponder including an antenna circuit having an antenna, a Schottky diode serially connected to the antenna, a power supply applied serially across the antenna and the Schottky diode for respectively imparting an impedance across the antenna and the Schottky diode, and a bias current applied across the Schottky diode to realize a desired impedance of the Schottky diode in relation to impedance of the antenna with the resulting antenna circuit realizing a desired power transfer dependent upon the relative impedances of the antenna and the Schottky diode; and the transponder being selectively tunable within a range of detuned and fully tuned states by way of configuring the bias current across the Schottky diode to realize a desired power transfer for the antenna circuit which imparts a desired signal sensitivity to the transponder.

According to a third aspect of this invention, an adjustable radio frequency data communication device comprises:

a semiconductor circuit package including a microprocessor, a semiconductor integrated circuit supported by the semiconductor circuit package including a discrete semiconductor die having integrated circuitry fabricated therein; and a transponder electrically connected to the integrated circuitry within the semiconductor circuit package, the transponder including an antenna circuit having an antenna, a Schottky diode serially connected to the antenna, a signal source configured to apply a signal serially across the antenna and the diode for respectively imparting an impedance across the antenna and the diode, a bias current supply configurable to apply a desired bias current across the Schottky diode to realize a desired impedance of the Schottky diode in relation to impedance of the antenna when receiving the signal, the resulting antenna circuit realizing a desired power transfer dependent upon the ratio of antenna impedance to Schottky diode impedance;

the transponder being selectively tunable within a range of detuned and fully tuned states by way of configuring the bias current across the Schottky diode to realize a desired power transfer for the antenna circuit which in conjunction with the semiconductor circuit package cooperates with the microprocessor of the transponder to reconfigure the transponder into various tunable states.

According to a fourth aspect of this invention, a communications circuit having adjustable sensitivity configured for use in a radio frequency data communications device, comprises:

a first circuit element constructed and arranged to electrically cooperate with electromagnetic waves, the electromagnetic waves corresponding to a signal carried by the antenna and generated from a signal source;

a second circuit element electrically coupled in serial relation with the first circuit element, in operation the signal being applied serially across the first circuit element and the second circuit element in direct relation with electromagnetic waves transferred by the first circuit element; and a bias current supply electrically coupled to the second circuit element and configurable to deliver a desired bias current across the second circuit element, the second circuit element responsive to the bias current to realize a desired impedance of the second circuit element such that a desired impedance match is provided between impedance of the first circuit element and impedance of the second circuit element when the signal is applied across the first and second circuit elements, which selectively tunes the antenna circuit by imparting a desired power transfer therein;

in use, said second circuit element receiving a bias current so as to impart a specific second circuit element impedance for realizing a selective impedance match between said first and second circuit elements to obtain a desired power transfer for the communications circuit.

Referring more particularly to the drawings, FIG. 1 illustrates a radio frequency communication system 10 having an interrogator unit 12 and a radio frequency data communications device 14 housed within an identification postage stamp 24 incorporating circuitry of this invention. The interrogator unit 12 has an antenna 16, as well as dedicated transmitting and receiving circuitry (not shown). The device 14 also has an antenna 18, preferably a loop antenna formed from a conductive layer of printed thick film forming a conductive microstrip. Preferably, the printed thick film is formed with conductive silver. Alternatively, a conductive silver-filled epoxy can be used.

Generally, the interrogator unit 12 transmits a Radio Frequency (RF) interrogation signal 20 comprising electromagnetic waves via antenna 16, and the transponder device 14 receives the incoming interrogation signal 20 with antenna 18. In this case, the interrogator unit 12 functions as a signal source. Upon receiving the signal 20, the transponder device 14 responds by generating and transmitting a responsive RF signal 22. Details of one exemplary interrogator unit implemented in combination with a transponder unit are disclosed in U.S. Pat. No. 4,857,893, hereby incorporated by reference. Furthermore, details of construction for several radio frequency data communications devices utilizing an alternative adjustable receiver sensitivity are disclosed in U.S. patent application Ser. No. / , "Radio Frequency Data Communications Device With Adjustable Receiver Sensitivity and Method", listing Mark E. Tuttle and John R. Tuttle as inventors (now U.S. Pat. No. ). This patent application and resulting patent are hereby incorporated by reference as if fully included herein. The device of this invention can be implemented variously on the embodiments detailed in the above co-pending patent application.

Preferably, radio frequency data communications device 14 of FIG. 1 is constructed as an integral component of an identification postage stamp 24. The components forming device 14 are carried by the postage stamp, wherein the postage stamp is formed from a thin sheet or card 25 of plastic material having a thickness of about 0.005 inches, and a width and height of about 1.25 inches. The card 25 forms a package for carrying device 14. Device 14 includes the antenna 18 which is preferably constructed from a continuous piece of conductive printed thick film or microstrip configured in the shape of a square to form a loop antenna about the outer periphery of the card. Alternatively, the antenna can be formed along an outer periphery of the integrated circuit 26. Additionally, device 14 includes a thin profile button-type battery 28 forming a small, thin energy cell having a thin profile, and a semiconductor transponder integrated circuit 26 formed from a silicon-based chip or wafer.

In order to present a smooth and compact package for the device 14, the antenna 18 is printed onto the back of the card 25 with conductive silver printed thick film material. Additionally, the integrated circuit 26 and battery 28 once electrically connected to the antenna are bonded to the back face of the plastic card by embedding them in a thin layer of non-conductive epoxy material. However, details of integrated circuit 26 differ from that disclosed in applicant's previously mentioned co-pending application in that radio frequency sensitivity of the antenna 18 is regulated with novel circuitry implemented on integrated circuit 26 and comprising the subject matter of this invention.

To facilitate remote placement on an object, the transponder device 14 of FIG. 1 is electrically powered by battery 28. In order to conserve the power supplied from battery 28, preferably, device 14 goes into a sleep, or battery conserving stand-by mode of operation during long time periods where no interrogation signal 20 is received by the device. Preferably, receipt of an interrogation signal by the device wakes up the device, returning it to a full power operating mode.

In order to further extend the life of battery 28, the receiver sensitivity of the transponder device 14 is preferably tuned over a range of tuned and detuned states by controlling sensitivity of the radio frequency antenna via impedance matching or mis-matching of components forming the antenna circuit. Impedance matching or mis-matching modifies the ability of the device to detect signal 20, and therefore adjusts the tendency for the device to wake up.

Alternatively, in a similar manner the transmitting sensitivity of the antenna 18 can be modified by impedance matching, or intentional mis-matching of components forming the antenna circuit 46 during transmitting modes of operation. For purposes of this disclosure and s claimed invention, tuning includes tuning by matching impedances of circuit elements, as well as intentional detuning by mis-matching impedances of circuit elements. Likewise, selective impedance matching for purpose of this disclosure and claimed invention includes impedance matching, as well as intentional impedance mis-matching.

Preferably, the receiver sensitivity of the device 14 is adjusted by matching or mismatching the impedance of the antenna 18 with respect to a circuit element that has a current adjustable impedance. Preferably, the impedance adjustable circuit element is a Schottky diode that is electrically configured to receive a dc bias current. The diode is forward biased by the current which changes impedance of the diode, and allows for realization of a desired impedance as will be discussed pursuant to FIGS. 3–7. Alternatively, the diode can be reverse biased. Additionally, the transmitting sensitivity of the device can be adjusted in essentially the same manner by regulating delivery of a bias current to the Schottky diode configured in series relation with the antenna during signal transmitting modes of operation. In such a case, a signal oscillator is used to drive the device 14.

Figure 2:
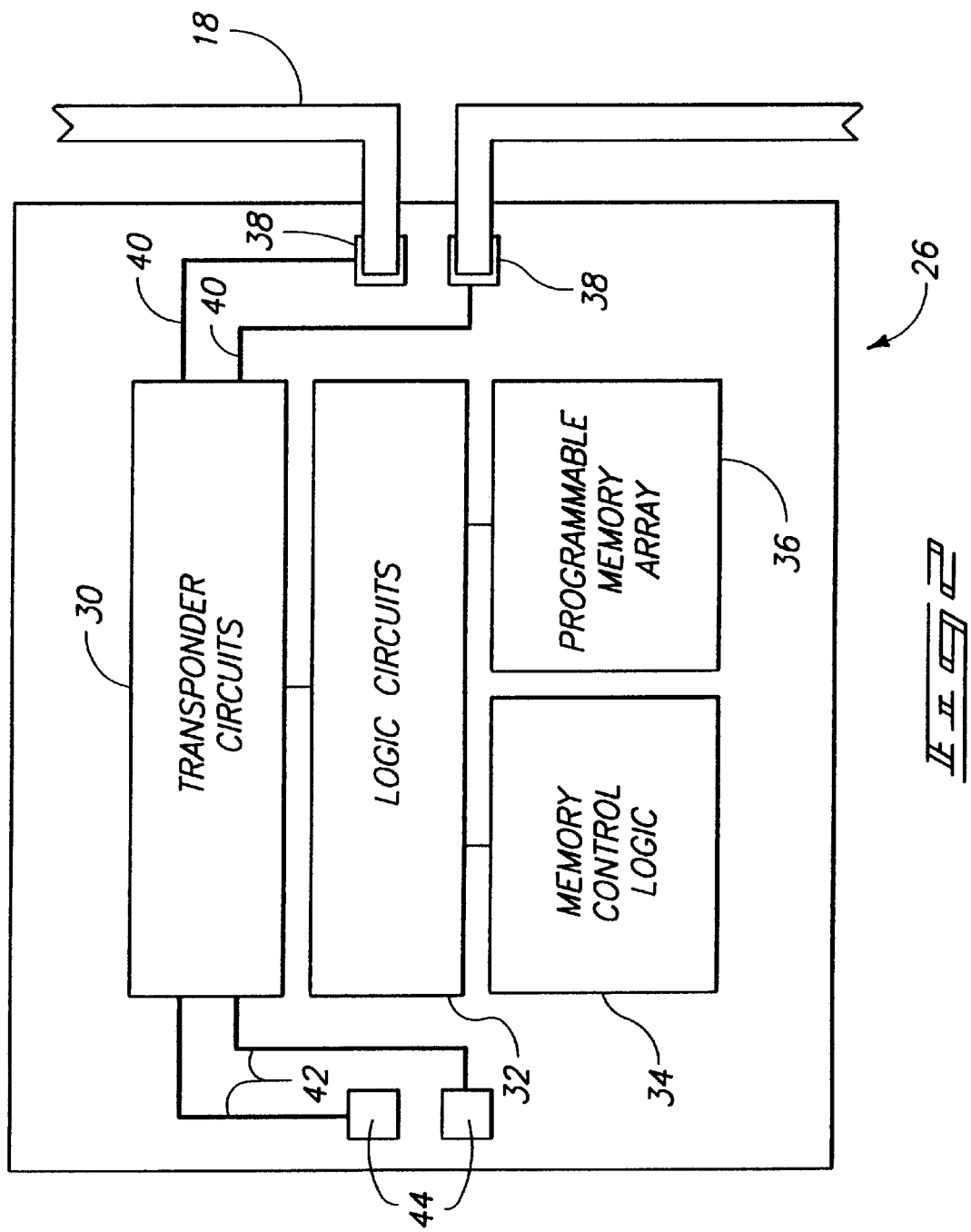
FIG. 2 is a plan view of a monolithic semiconductor integrated circuit utilized in the device of FIG. 1 illustrating an integrated circuitry layout including a current-controlled Schottky diode configured for use with a hybrid printed thick film antenna.

FIG. 2 depicts a particular construction of the integrated circuit 26 as implemented on the transponder device 14 of FIG. 1. Preferably, the integrated circuit is formed from a single monolithic silicon-based chip, of wafer or die construction, wherein the wafer receives an array of transponder circuits 30, logic circuits 32, memory control logic circuits 34, and a programmable memory array 36 according to standard semiconductor wafer processing steps. When integrated circuit 26 is used to form a microprocessor controlled tag apparatus, logic circuits 32, memory control logic 34 and programmable memory array 36 can be at least partially provided in the form of a microprocessor. Additionally, pairs of conductive die pads 38 and 44 are formed on the integrated circuit in order to facilitate electrical connection via conductive lines 40 and 42, respectively, with the antenna 18 and battery 28, respectively. Preferably, conductive lines 40 and 42 are formed from conductive monolithic lithographic or thin film print techniques. Card 25 along with epoxy material form a package for carrying the integrated circuit 26 (FIG. 1).

Figure 3:
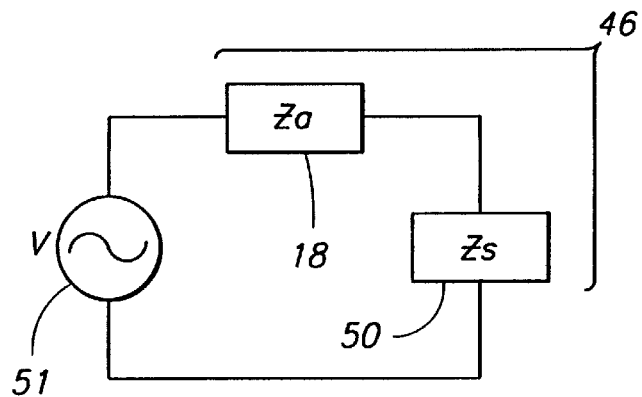
FIG. 3 is a schematic block diagram for an antenna circuit of this invention implemented in a transmitting mode for use on the device of FIG. 2.

FIG. 3 depicts a schematic illustration of an antenna circuit 46 including first and second circuit elements: namely, antenna 18 having impedance $Z_a$, and a current controlled diode circuit 50 having impedance $Z_b$. Antenna circuit 46 is provided by the transponder circuits 30 provided in the integrated circuit 26 of FIG. 2. A signal characterizing device 51 also shown in the circuit can be an RF generator, or signal oscillator providing a power supply for the case where the antenna circuit configuration of FIG. 3 is functioning in an RF transmitting mode. For cases where the antenna circuit configuration is functioning in a receiving mode, the signal characterizing device can be an RF receiving circuit formed by the transponder circuits 30 of FIG. 2. In both cases, the antenna transfers electromagnetic waves or radiation forming the associated RF signal. One suitable receiving circuit would be an AM or FM radio receiving circuit typically having amplifying and signal conditioning circuitry. Various alternative constructions for a receiving circuit are readily known in the art. However, the ability to impedance match a current biased Schottky diode electrically configured in series with an antenna in order to tune or intentionally detune a transmitting and/or receiving antenna circuit is new.

Figure 4:
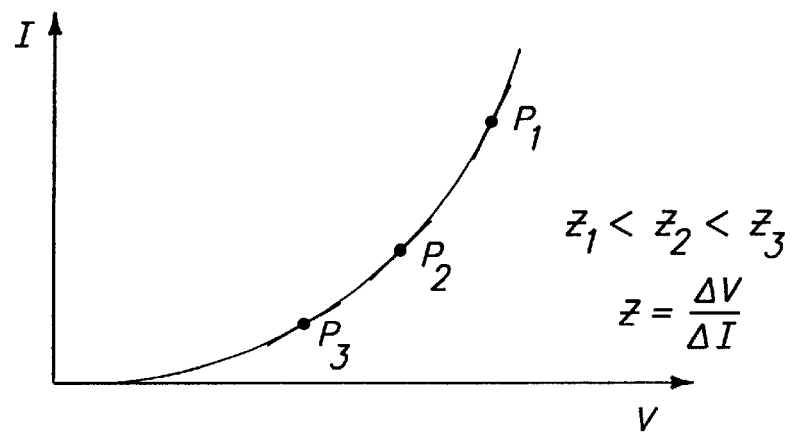
FIG. 4 is a plot illustrating impedance versus applied voltage for a Schottky diode utilized as one of the antenna circuit elements of FIG. 3.

FIG. 4 illustrates a plot of current versus voltage for a Schottky diode suitable for use in diode circuit 50 of FIG. 3 operating in a forward biased mode from a bias current. By determining a desired impedance Z for the diode that realizes a particular impedance match (or mismatch) with the antenna and bias current circuitry, a point P on the curve corresponding to the desired impedance Z can be located, and a suitable bias current I can be determined from the plot. As shown in FIG. 4, impedance Z is 1/slope, or $\Delta V/\Delta I$. Hence, changes in impedance are indicated by changes in the slope of the curve. By setting the bias current to a suitable level of current, I, a desired impedance Z can be realized for the diode. In actuality, the diode of FIG. 4 is realized as the current controlled diode circuit 50 of FIG. 5 wherein the current controlled impedance is actually the impedance of the entire diode circuit 50. One implementation for diode circuit 50 is shown in FIG. 7 and will be discussed in detail below, wherein a voltage regulating circuit in series with a high line resistance is used to form an ideal current source which imparts the desired bias current to the Schottky diode 52. Preferably, the circuit of FIG. 7 is implemented in the transponder circuits 30 of FIG. 2.

Figure 5:
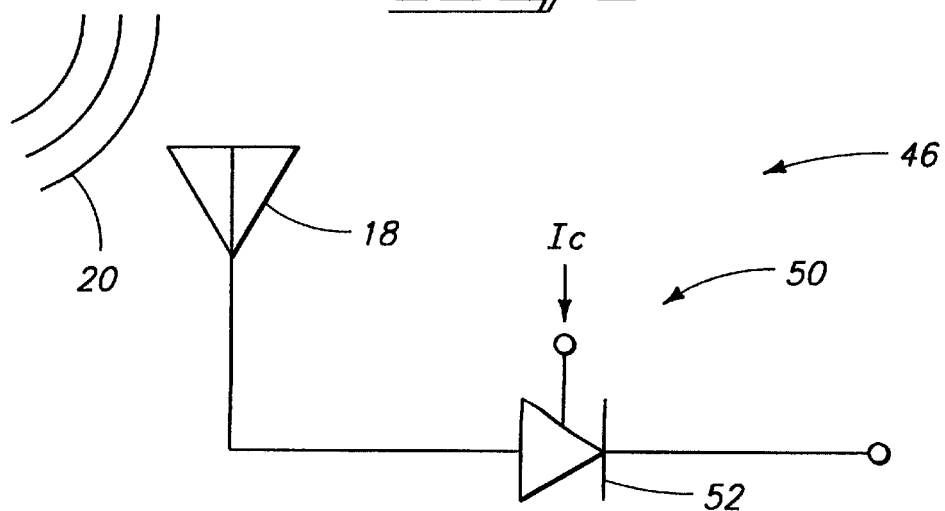
FIG. 5 depicts a somewhat diagrammatic illustration of an antenna and Schottky diode circuit configuration of this invention similar to that depicted in FIG. 3, but implemented in a receiving mode.

FIG. 5 is a diagrammatic illustration of an antenna circuit 46 including an antenna 18 and current controlled Schottky diode 52 of this invention similar to that depicted in FIG. 3, but implemented in a receiving mode. The current controlled diode circuit 50 is simplistically depicted as a three-terminal device in order to facilitate the overall representation of the antenna circuit. In actuality, the Schottky diode 52 is a two-terminal device that uses a circuit implementation in order to apply a desired bias current $I_C$ across the diode, producing the desired impedance characteristics. For the case where an ideal current source is available to apply a bias current $I_C$ to the diode 52, the impedance of diode 52 substantially approximates the impedance for the entire diode circuit 50, namely $Z_S$ as shown in FIG. 3. However, the implementation of the diode circuit 50 utilizes additional circuit elements as discussed below in FIG. 7.

As shown in FIG. 5, for the case of an antenna circuit configured to receive an interrogation signal 20, the antenna 18 receives an oscillating RF signal 20 which powers the antenna circuit formed by the antenna 18 and the current controlled diode circuit 50. By controlling current input $I_C$ to diode 52, impedance of the diode can be tailored to achieve a desired impedance for Schottky diode 52 corresponding to a desired impedance for diode circuit 50 relative to impedance for antenna 18. It is well known that matching of impedance for the antenna and diode for the circuits of FIGS. 3 and 5, where they are the only circuit elements imparting impedance to the antenna circuit will maximize power transfer and reception sensitivity, respectively.

In order to realize a maximum power transfer for a two-circuit component device such as depicted in FIGS. 3 and 5, it is desirable to proportion or match impedance for the two devices. Namely, impedance for the antenna 18 and the Schottky diode circuit 50 should be matched when it is desirable to maximize antenna receiver sensitivity. For circuits that can be adequately represented by a simple resistance, maximum power transfer delivered to the load occurs when the load resistance is equal to the output resistance. In this simplified configuration, this result holds for transfers between any two circuits pursuant to the readily known maximum power theorem. A similar analysis can be performed for power transfer between circuits having complex impedances, instead of simple resistances. A more general result follows for maximum power transfer, wherein the impedance of the load should equal the complex conjugate of the impedance of the output. By intentionally deviating from a tuned, or impedance matched state, a partially or selectively tuned circuit implementation can be realized to adjust antenna circuit transmitting and/or receiving sensitivities.

Similarly, for cases where it is desirable to reduce the signal sensitivity of an antenna circuit 46 formed with diode circuit 50 and antenna 18 of FIG. 3, an intentional mis-matching of impedances $Z_a$ and $Z_s$ will produce an antenna circuit 46 having a reduced transmitting sensitivity. For the construction of FIG. 5, mis-matching of impedances between the antenna 18 and the diode circuit 50 produces an antenna circuit 46 having a reduced transmitting range. By varying the degree of mis-match between antenna 18 and diode circuit 50, the transmitting and receiving sensitivities, respectively of an antenna circuit 46 can be tailored to achieve a desired sensitivity. In this manner, devices utilizing an antenna circuit 46 such as device 14 found in postage stamp 24 can be produced from a single lot having identical characteristics. Subsequently, impedance mis-matching, or matching can be implemented to realize a desired impedance for the antenna circuit in the device. Preferably, an adjustable current source is used to tailor a bias current across the Schottky diode 52 in order to realize a desired impedance over the Schottky diode, or diode circuit 50.

FIG. 6 depicts a semiconductor integrated circuit construction for the Schottky diode 52 of FIG. 5 implemented as a transponder circuit element on the integrated circuit of FIG. 2. Diode 52 is formed on an integrated circuit with semiconductor wafer processing techniques. Aluminum 64 is preferably deposited directly onto n-type silicon 72 to form an equivalent p structure, resulting in an excellent metal-semiconductor diode at contact 60. Likewise, aluminum 64 is deposited atop n+ diffusions 70 in order to form an ohmic, or nonrectifying contact 62. N-type silicon forms layer 72 and p-type silicon forms layer 74. A layer of silicon dioxide 68 is deposited on layer 72. In this manner, contact 60 forms an anode and contact 62 forms a cathode for a metal-semiconductor diode which is formed therebetween.

FIG. 7 depicts one circuit implementation for realizing a current controlled diode circuit 50. A bias current is supplied to diode 52 with a current controlled diode circuit 50. The impedance for the entire diode circuit 50 is matched relative to impedance for the antenna. For cases where a bias current can be applied to diode 52 with a circuit construction adding only a negligible impedance contribution to the circuit, the impedance of diode 52 can be directly matched to the impedance of the antenna. Where the signal characterizing device 51 of FIG. 3 consists of a receiving circuit and the antenna 18 receives RF signal 20 to power the circuit, the FIG. 5 device is essentially identical and the impedance matching of the antenna and diode circuit maximizes receiver sensitivity for the antenna circuit.

FIG. 7 depicts one technique for realizing a variable voltage source, essentially a potentiometer 56 configured across a battery 54 is utilized to deliver a user controlled current to diode 52 as discussed below. In another manner, an ideal current source is realized as software within the programmable memory array 36 of the device in FIG. 2 in order to deliver a desired current to diode 52. In a third variation, a plurality of redundant circuits are provided within circuits 30 of FIG. 2 in order to impart a desired bias current to diode 52 such that circuit implementation is selectively configured after manufacture, either at the factory via a burn-in technique or a temporary pin connection technique, or by a user via a software-based circuit reconfiguration.

FIG. 7 illustrates an exemplary circuit implementation for realizing the current controlled Schottky diode circuit 50 of FIGS. 3 and 5. The Schottky diode 52, whose construction is depicted in FIG. 6 above, is formed between contacts 60 and 62. An adjustable ideal current source is serially connected to a port or contact 60 and is formed by the various circuit elements depicted between contact 58 and contact 60. Namely, a battery 54 delivers a regulated voltage via an adjustable potentiometer 56 configured as a voltage divider and connected to integrated circuit 26 by a port, for example a pair of terminals. The adjusted potentiometer imparts a bias voltage to contact 60 and diode 52. For the case where a large resistor 57 is also included, the adjustable voltage supply acts as an ideal current source. Therefore, for cases where line resistance is sufficiently high, an actual resistive element 57 may be omitted when it is necessary to supply an ideal current source.

For purposes of impedance-matching antenna 18 with diode circuit 50, contribution from each of the circuit elements in diode circuit 50 of FIG. 7 will contribute to the overall impedance of the circuit 50. Diode 52 is operated in a forward-biased mode to achieve a desired impedance. Alternatively, by reversing the polarity of battery 54, the Schottky diode 52 can be reverse biased, imparting similarly known non-linear current versus voltage characteristics, similar to those depicted in FIG. 4 for the forward-biased condition. Various alternative constructions for an adjustable current source are readily known in the circuit art for imparting a desired adjustable bias-current across diode 52.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A radio frequency system comprising:
   an antenna;
   a receiver including a Schottky diode electrically coupled in serial relation with the antenna; and a current supply electrically coupled to the Schottky diode and configurable to deliver a desired bias current across the Schottky diode, the Schottky diode being responsive to the bias current to realize a desired impedance across the Schottky diode such that a desired impedance match is provided between impedance of the Schottky diode and impedance of the antenna when the signal is applied across the antenna circuit, wherein reception range of the receiver is adjustable by adjusting the bias current.

2. The system of claim 1 wherein the bias current is proportioned to realize an impedance of the diode that substantially mis-matches an impedance of the antenna when the antenna is driven by a signal so as to selectively detune the system and realize a desired receiver sensitivity.

3. The system of claim 1 wherein the antenna comprises a microstrip antenna.

4. The system of claim 1 wherein the receiver is formed on an integrated circuit.

5. The system of claim 1 wherein the current supply comprises a battery electrically connected across the Schottky diode so as to provide a dc bias voltage.

6. The system of claim 5 further comprising a potentiometer electrically coupled to the battery and the Schottky diode to provide a voltage divider operable to adjust the dc bias voltage across the Schottky diode.

7. The system of claim 6 further comprising a resistor connected in series between the potentiometer and the Schottky diode, the resistor operable to configure the potentiometer as a substantially ideal current source.

8. An apparatus comprising:

a package;

a monolithic semiconductor integrated circuit supported by the package and having a microprocessor and integrated circuitry; and a transponder coupled to the integrated circuitry of the semiconductor integrated circuit, the transponder including an antenna circuit having an antenna, a Schottky diode serially connected to the antenna, a power supply applied serially across the antenna and the Schottky diode for respectively imparting an impedance across the antenna and the Schottky diode, and an adjustable bias current applied across the Schottky diode to realize a desired impedance of the Schottky diode in relation to impedance of the antenna; and the transponder being selectively tunable within a range of detuned and fully tuned states by way of configuring the bias current across the Schottky diode which imparts a desired signal sensitivity to the transponder.

9. The apparatus of claim 8 wherein the antenna circuit comprises the antenna, the Schottky diode, and the bias current supply, and the bias current supplied to the Schottky diode is proportioned to realize impedance of the Schottky diode substantially matching impedance of the antenna so as to maximize radio frequency signal sensitivity of the antenna circuit.

10. The apparatus of claim 8 wherein the antenna circuit comprises the antenna, the Schottky diode, and the bias current supply, and the bias current supplied to the Schottky diode is proportioned to realize impedance of the Schottky diode intentionally mis-matched with impedance of the antenna so as to detune the antenna circuit and realize a desired antenna circuit sensitivity.

11. An adjustable radio frequency data communication device comprising:

a semiconductor circuit package including a microprocessor, a semiconductor integrated circuit supported by the semiconductor circuit package including a discrete semiconductor die having integrated circuitry fabricated therein; and a transponder electrically connected to the integrated circuitry within the semiconductor circuit package, the transponder including an antenna circuit having an antenna, a Schottky diode serially connected to the antenna, a signal source configured to apply a signal serially across the antenna and the diode for respectively imparting an impedance across the antenna and the diode, a bias current supply configurable to apply a desired bias current across the Schottky diode to realize a desired impedance of the Schottky diode in relation to impedance of the antenna when receiving the signal, the resulting antenna circuit realizing a desired power transfer dependent upon the ratio of antenna impedance to Schottky diode impedance;

the transponder being selectively tunable within a range of detuned and fully tuned states by way of configuring the bias current across the Schottky diode to adjust the sensitivity of the transponder.

* * * * *

UNITED STATES PATENT AND TRADEMARK OFFICE
CERTIFICATE OF CORRECTION

PATENT NO. : 5,970,398
DATED : October 19, 1999
INVENTOR(S) : John R. Tuttle

It is certified that error appears in the above-identified patent and that said Letters Patent is hereby corrected as shown below:

Column 5, line 26, replace "and s claimed" with --and claimed--.

Signed and Sealed this

Sixth Day of March, 2001

Attest:

NICHOLAS P. GODICI

Attesting Officer

Acting Director of the United States Patent and Trademark Office